United States Patent

Hayama

[11] Patent Number: 5,919,069
[45] Date of Patent: Jul. 6, 1999

[54] METHOD AND APPARATUS FOR ASSEMBLING CATHODE-RAY TUBE

[75] Inventor: Sachiho Hayama, Osaka, Japan

[73] Assignee: Matsushita Electric Industrial Co., Ltd., Japan

[21] Appl. No.: 08/891,209

[22] Filed: Jul. 11, 1997

[30] Foreign Application Priority Data

Sep. 11, 1996 [JP] Japan .................................. 8-240043

[51] Int. Cl.6 ........................................................ H01J 9/00
[52] U.S. Cl. ............................................. 445/23; 445/66
[58] Field of Search ................................. 445/23, 64, 66

[56] References Cited

U.S. PATENT DOCUMENTS

| | | | |
|---|---|---|---|
| 4,902,258 | 2/1990 | Dunsmore et al. | 445/66 |
| 5,252,099 | 10/1993 | Clain et al. | 445/23 |

FOREIGN PATENT DOCUMENTS 60-153070  10/1985  Japan .

OTHER PUBLICATIONS

Patent Abstracts of Japan, Publication No. 02224939 A; Sep. 6, 1990; "Display Method for Parts Number"; (Fujitsu General Ltd).

Patent Abstracts of Japan, Publication No. 05183844 A; Jul. 23, 1993; "Fitting Device for Cathode–Ray Tube"; (Hitachi Ltd).

Patent Abstracts of Japan, Publication No. 60090477 A; May 21, 1985; "Fixing Device of Cathode–Ray Tube"; (Toshiba Corp).

Primary Examiner—Kenneth J. Ramsey
Attorney, Agent, or Firm—Parkhurst & Wendel

[57] ABSTRACT

It is an object of the present invention to provide a method for assembling cathode-ray tubes, which does not require a transfer device and which yields good operating efficiency at the time of switching between models. When a cathode-ray tube is inserted into a cabinet, a suction device is inserted through an opening in the front of the cabinet in an upright position and holds the front face of the cathode-ray tube in an upright position, the cathode-ray tube is moved to a fixing position in the cabinet by relative movement of the suction device and the cabinet, the cathode-ray tube is fixed to the cabinet from the rear side of the cabinet by means of a screw fastening device, and the suction device is released from the cathode-ray tube.

4 Claims, 4 Drawing Sheets

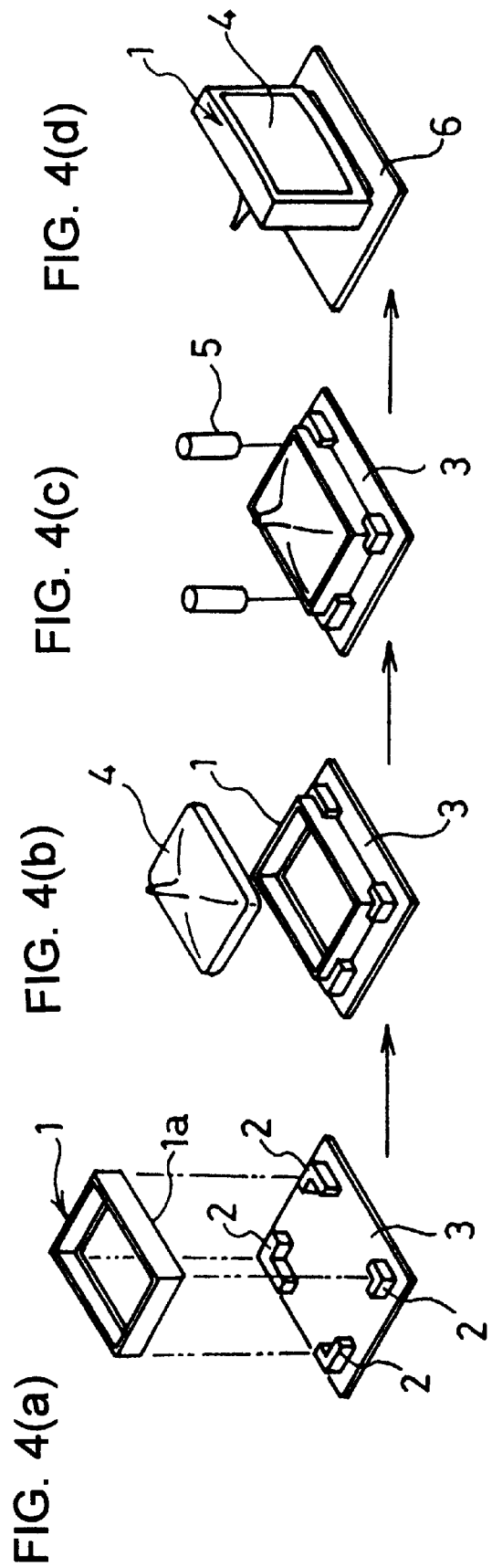

METHOD AND APPARATUS FOR ASSEMBLING CATHODE-RAY TUBE

TECHNICAL FIELD

The present invention relates to a method and apparatus for assembling a cathode-ray tube used in the manufacture of display units wherein a cathode-ray tube is assembled in a cabinet, such as a television receiver.

BACKGROUND ART

In an industrial process for assembling a cathode-ray tube in a cabinet, conventionally, an assembly process as illustrated in FIG. 4 is conducted.

As shown in FIG. 4(a), a cabinet 1 is placed with its front side 1a facing downwards on a jig pallet 3 whereon locating blocks 2 are provided in four corners corresponding to the size of the cabinet 1.

Thereupon, as shown in FIG. 4(b), a cathode-ray tube 4 is placed over the cabinet 1. The cathode-ray tube 4 is then bolted to the cabinet by means of a bolt fastening device 5, as shown in FIG. 4(c), and the cabinet 1 assembled with the cathode-ray tube 4 is rotated to an upright position and transferred to a completion pallet 6 by a transfer device.

DISCLOSURE OF THE INVENTION

When assembling a variety of cathode-ray tubes of different sizes, it is necessary to change in advance the position of the locating blocks 2 provided at the respective corners of the jig pallet 3.

Furthermore, since it is necessary to transfer from the state shown in FIG. 4(c) to the state shown in FIG. 4(d), a transfer device is also required.

It is an object of the present invention to provide a method for assembling a cathode-ray tube which does not require advance preparations, such as changing the position of locating blocks 2, as in conventional methods, at the time of switching between different types of cathode-ray tube.

The method for assembling a cathode-ray tube according to claim 1 is characterized in that, when a cathode-ray tube is inserted into a cabinet, suction means is inserted through an opening in the front of the cabinet in an upright position and the front face of the cathode-ray tube in an upright position is held by the suction means, the cathode-ray tube is moved to an assembling position in the cabinet by relative movement of the suction means and the cabinet, the cathode-ray tube is fixed to the cabinet from the rear side of the cabinet, and the suction means is released from the cathode-ray tube.

The method for assembling a cathode-ray tube according to claim 2 is characterized in that, when a cathode-ray tube is inserted into a cabinet, suction means is inserted through an opening in the front of the cabinet in an upright position and the front face of the cathode-ray tube in an upright position is held by the suction means, the cathode-ray tube is moved to an assembling position in the cabinet by moving the suction means with respect to the cabinet, the cathode-ray tube is fixed to the cabinet from the rear side of the cabinet, and the suction means is released from the cathode-ray tube.

The apparatus for assembling a cathode-ray tube according to claim 3 is characterized in that it comprises: a cabinet conveyor line for conveying cabinets in an upright position; a cathode-ray tube conveyor line for conveying cathode-ray tubes in an upright position, which is located to the rear of the cabinet conveyor line; and a suction device located in front of the cabinet conveyor line, which is inserted through an opening in the front of a cabinet being conveyed by the cabinet conveyor line and holds a cathode-ray tube by suction.

The apparatus for assembling a cathode-ray tube according to claim 4 is characterized in that, in the apparatus of claim 3, the suction device which is inserted through an opening in the front of a cabinet and holds a cathode-ray tube by suction is supported such that it can move downstream in the conveyor direction of the cabinet conveyor line.

BRIEF DESCRIPTION OF THE DRAWINGS

FIGS. 4(c)–4(d) show steps in a conventional method for assembling a cathode-ray tube.

DESCRIPTION OF THE EMBODIMENT

Below, an embodiment of the present invention is described with reference to FIG. 1–FIG. 3.

In this description, same symbols are used for those elements having the same functions as in the prior art example shown in FIG. 4.

Figure 1:
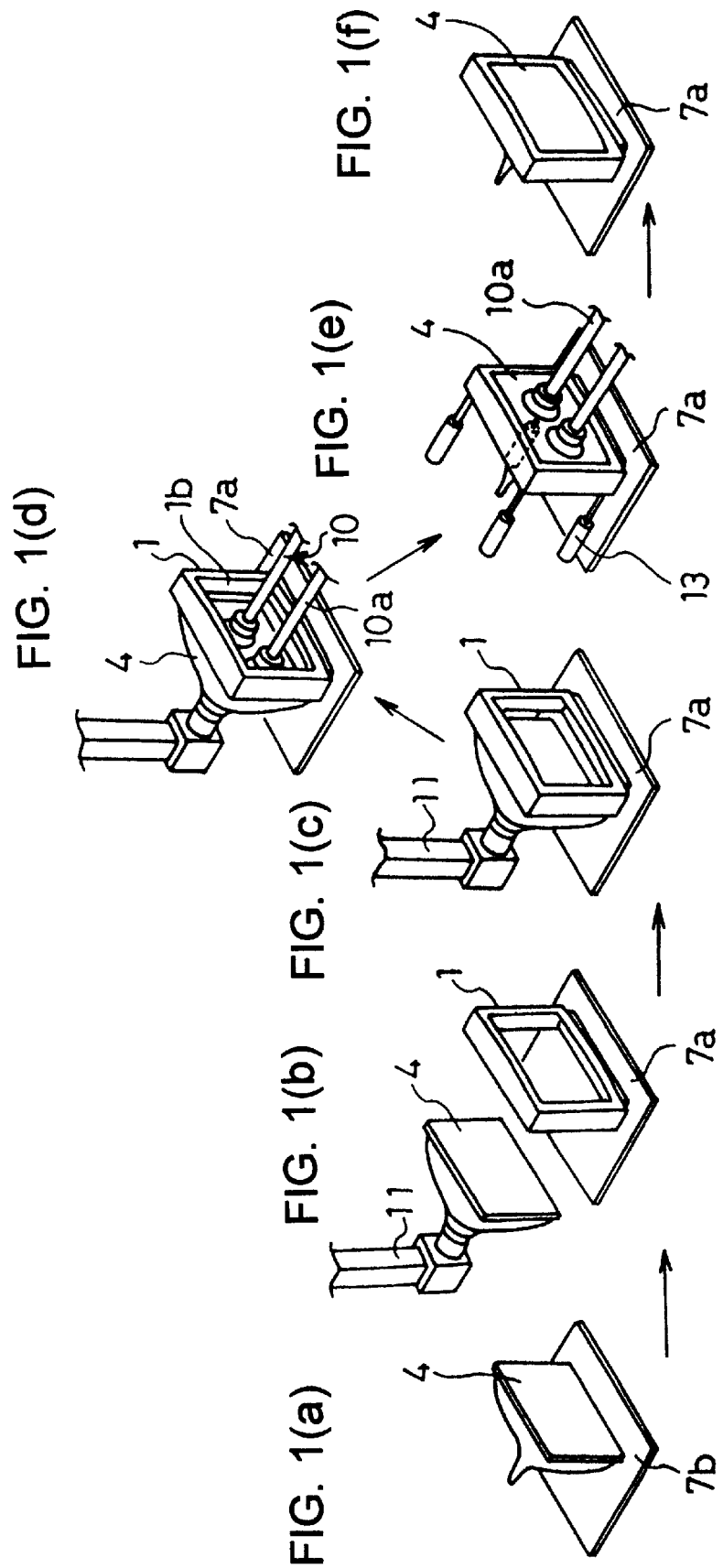
FIGS. 1(a)–1(f) show steps in the method for assembling a cathode-ray tube according to the present invention.
Figure 2:
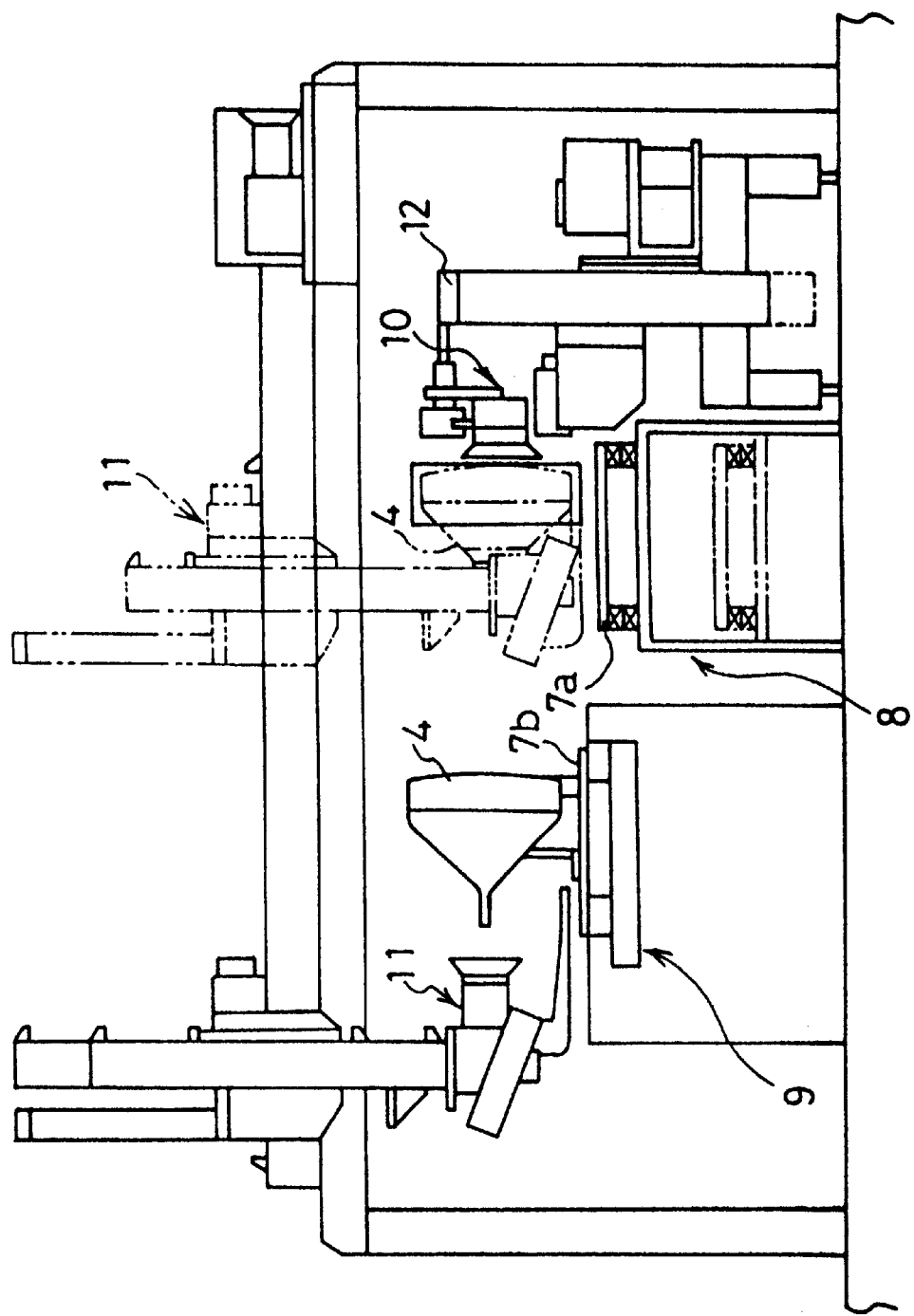
FIG. 2 is a cross section of a principal part of an apparatus for assembling a cathode-ray tube according to an embodiment of the invention, taken in a perpendicular direction to the conveyor direction.
Figure 3:
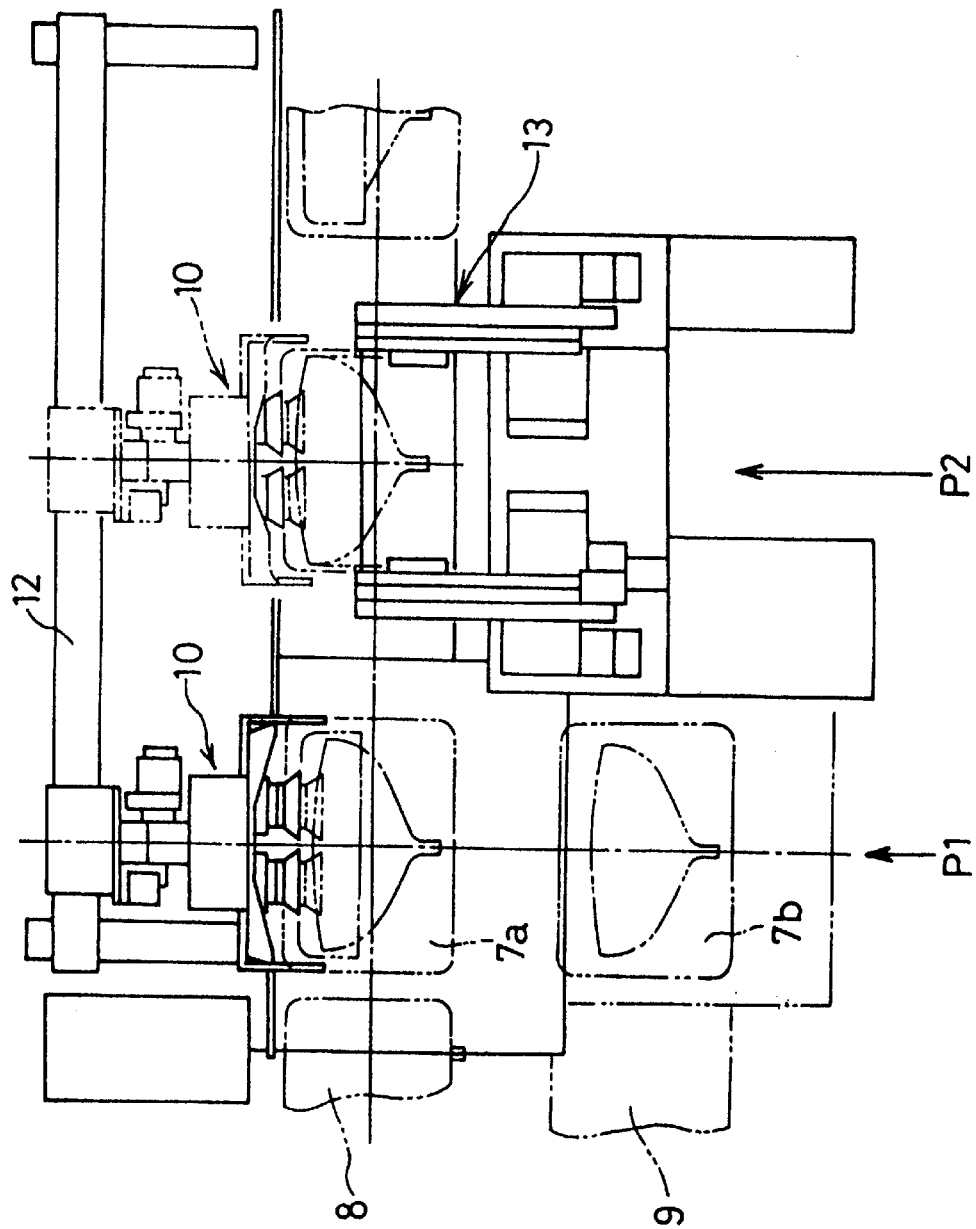
FIG. 3 is a principal plan view of the principal part of the apparatus for assembling a cathode-ray tube according to the same embodiment.

FIG. 1 shows steps in a method for assembling a cathode-ray tube according to the present invention; and FIG. 2 and FIG. 3 show an apparatus for assembling a cathode-ray tube used in the embodiment of assembling a cathode-ray tube according to the present invention.

As shown in FIG. 2, a cabinet conveyor line 8 which conveys a cabinet 1 carried on a pallet 7a is positioned centrally, and a cathode-ray tube conveyor line 9 which conveys a cathode-ray tube 4 carried on a pallet 7b is located to the rear of this cabinet conveyor line 8. A suction device 10 is provided in front of the cabinet conveyor line 8.

As shown in FIG. 1(a) and FIG. 2, the cathode-ray tube 4 is positioned on a pallet 7b and conveyed in an upright position. When the cathode-ray tube 4 reaches the end section of the cathode-ray tube conveyor line 9, it is lifted from the pallet 7b by means of a cathode-ray tube conveyor device 11, as shown in FIG. 1(b), and moved to a position over the cabinet conveyor line 8, as shown in FIG. 1(c) and by dashed lines in FIG. 2.

In this state, arms 10a on the aforementioned suction device 10 are inserted through an opening 1b in the front of the cabinet 1 and hold the front face of the cathode-ray tube 4, as shown in FIG. 1(d). The cathode-ray tube conveyor device 11 then releases the cathode-ray tube 4 and returns to its initial position, and the arms 10a of the suction device 10 draw the cathode-ray tube 4 they are holding inside the cabinet 1.

The suction device 10 is supported by a guide 12 such that it can move downstream in the conveyance direction of the cabinet conveyor line 8, as shown in FIG. 3. The cabinet 1 in which the cathode-ray tube 4 is held by the suction device 10 is moved downstream to a screw fastening position P2 by driving the cabinet conveyor line 8. During this operation, the suction device 10 is driven in synchronization with the cabinet conveyor line 8, and it is moved to the screw fastening position P2 together with the cabinet 1.

A screw fastening device 13 is located to the rear of the cabinet 1, downstream on the cabinet conveyor line 8 from the cathode-ray tube insertion position P1 (initial position of the suction device 10), and when the cabinet 1 reaches the screw fastening position P2, the screw fastening device 13 advances towards the cabinet conveyor line 8, as shown in FIG. 3, to screw the cathode-ray tube 4 to the cabinet 1, and when screw fastening is completed, the screw fastening device 13 withdraws to its initial position, while the suction device 10 releases the cathode-ray tube 4, withdraws the arms 10a, and automatically returns to its initial position. The cabinet 1 in which the cathode-ray tube 4 is assembled remains on the pallet 7a, and is moved further downstream on the cabinet conveyor line 8.

The pitch between pallets 7a on the cabinet conveyor line 8 is so set that when one pallet 7a is in the screw fastening position P2, the next pallet 7a will be in the cathode-ray tube insertion position.

In this way, since the suction device 10 is inserted through the opening in the front of the cabinet 1 in an upright position such that it holds the front of the cathode-ray tube 4 in an upright position and moves the cathode-ray tube 4 to a cathode-ray tube assembling position in the cabinet 1, where the cathode-ray tube 4 is positioned and fixed from the rear side of the cabinet 1, it is not necessary to use a transfer device as required in conventional systems.

Furthermore, since the cathode-ray tube 4 is assembled while the cabinet 1 is conveyed in an upright position, it is not necessary, unlike the cases with conventional systems, to change the position of locating blocks in advance when the cathode-ray tubes 4 of different sizes are switched. Therefore, the method can be simpler than in a conventional system.

Furthermore, since the suction device 10 which is inserted through the opening in the front of the cabinet and holds the cathode-ray tube by suction is supported such that it can move downstream in the conveyor direction of the cabinet conveyor line 8, a cabinet 1 to which the cathode-ray tube 4 is not yet screw fastened can be transported from the cathode-ray tube insertion position P1 while being held by the suction device 10, and a cabinet 1 mounted on the next pallet 7a can be moved to the cathode-ray tube insertion position P1, whereby the task of moving the cathode-ray tube 4 over to the cabinet conveyor line 8 by means of the cathode-ray tube conveyor device 11 can be completed while the suction device 10 is returning to its initial position. Thus, good operating efficiency can be obtained.

In the embodiment described above, the cathode-ray tube 4 is held by suction by the suction device 10 and the cathode-ray tube 4 is inserted into the cabinet 1, but it is also possible to position the cathode-ray tube 4 in the cabinet 1 by moving the cabinet 1 with respect to the cathode-ray tube 4 held by suction by the suction device 10.

As demonstrated in the embodiment described above, when the construction according each claim of the present invention is adopted, the following particular advantages are obtained.

According to the method for assembling a cathode-ray tube as described in claim 1 of the present invention, since, when a cathode-ray tube is inserted into a cabinet, suction means is inserted through an opening in the front of the cabinet in an upright position and the front face of the cathode-ray tube in an upright position is held by the suction means, the cathode-ray tube is moved to an assembling position in the cabinet by relative movement of the suction means and the cabinet, the cathode-ray tube is fixed to the cabinet from the rear side of the cabinet, and the suction means is released from the cathode-ray tube, there is no need for a transfer device as required in conventional systems. Furthermore, unlike the cases with conventional systems, it is unnecessary to change the position of locating blocks in advance at the time of switching between cathode-ray tubes 4 of different sizes. Thus, it is possible to adopt a simpler method than in a conventional system.

According to the method for assembling a cathode-ray tube as described in claim 2 of the present invention, since, when a cathode-ray tube is inserted into a cabinet, suction means is inserted through an opening in the front of the cabinet in an upright position and the front face of the cathode-ray tube in an upright position is held by the suction means, the cathode-ray tube is moved to an assembling position in the cabinet by moving the suction means with respect to the cabinet, the cathode-ray tube is fixed to the cabinet from the rear side of the cabinet, and the suction means is released from the cathode-ray tube, there is no need for a transfer device as required in conventional systems. Furthermore, unlike the cases with conventional systems, it is unnecessary to change the position of locating blocks in advance at the time of switching between cathode-ray tubes 4 of different sizes. Thus, the method can be simpler than in a conventional system.

According to the apparatus for assembling a cathode-ray tube as described in claim 3 of the present invention, since said apparatus comprises a cabinet conveyor line for conveying cabinets in an upright position, a cathode-ray tube conveyor line for conveying cathode-ray tubes in an upright position, which is located to the rear of the cabinet conveyor line, and a suction device located in front of the cabinet conveyor line, which is inserted through an opening in the front of a cabinet being conveyed by the cabinet conveyor line and holds a cathode-ray tube by suction, it is possible to implement the method for assembling a cathode-ray tube according to the present invention.

According to the apparatus for assembling a cathode-ray tube as described in claim 4 of the present invention, if, in the apparatus of claim 3, the suction device which is inserted through an opening in the front of a cabinet and holds a cathode-ray tube by suction is supported such that it can move downstream in the conveyor direction of the cabinet conveyor line, then a cabinet to which the cathode-ray tube is not yet screw fastened can be transported from the cathode-ray tube insertion position while being held by the suction device, and the cabinet mounted on the next pallet can be moved to the cathode-ray tube insertion position. Thus, good operating efficiency can be obtained.

What is claimed is:

1. A method for assembling a cathode-ray tube, comprising the steps of:

when a cathode-ray tube is inserted into a cabinet;

inserting suction means through an opening in the front of the cabinet in an upright position, and holding the front face of the cathode-ray tube in an upright position by said suction means;

moving the cathode-ray tube to an assembling position in the cabinet by relative movement of said suction means and the cabinet;

fixing the cathode-ray tube to the cabinet from the rear side of the cabinet; and releasing said suction means from the cathode-ray tube.

2. A method for assembling a cathode-ray tube, comprising the steps of:

when a cathode-ray tube is inserted into a cabinet;

inserting suction means through an opening in the front of the cabinet in an upright position, and holding the front face of the cathode-ray tube in an upright position by said suction means;

moving the cathode-ray tube to an assembling position in the cabinet by moving said suction means with respect to the cabinet;

fixing the cathode-ray tube to the cabinet from the rear side of the cabinet; and releasing said suction means from the cathode-ray tube.

3. An apparatus for assembling a cathode-ray tube comprising:

a cabinet conveyor line for conveying cabinets in an upright position;

a cathode-ray tube conveyor line for conveying cathode-ray tubes in an upright position, which is located to the rear of the cabinet conveyor line; and a suction device located in front of the cabinet conveyor line, which is inserted through an opening in the front of a cabinet being conveyed by the cabinet conveyor line and holds a cathode-ray tube by suction.

4. An apparatus for assembling a cathode-ray tube according to claim 3, wherein the suction device which is inserted through an opening in the front of a cabinet and holds a cathode-ray tube by suction is supported such that it can move downstream in the conveyor direction of the cabinet conveyor line.

* * * * *